United States Patent
Leblans et al.

(10) Patent No.: US 6,815,095 B2
(45) Date of Patent: Nov. 9, 2004

(54) BINDERLESS PHOSPHOR SCREEN HAVING A PIGMENTED INTERLAYER

(75) Inventors: Paul Leblans, Kontich (BE); Luc Struye, Mortsel (BE); Ludo Joly, Hove (BE)

(73) Assignee: AGFA-Gevaert, Mortsel (BE)

( * ) Notice: Subject to any disclaimer, the term of this patent is extended or adjusted under 35 U.S.C. 154(b) by 0 days.

(21) Appl. No.: 10/342,712

(22) Filed: Nov. 21, 2002

(65) Prior Publication Data

US 2003/0134157 A1 Jul. 17, 2003

Related U.S. Application Data

(60) Provisional application No. 60/351,293, filed on Jan. 23, 2002.

(30) Foreign Application Priority Data

Dec. 3, 2001 (EP) .............................. 01000696

(51) Int. Cl.⁷ ................................. B32B 9/00
(52) U.S. Cl. ..................... 428/691; 428/690; 428/480; 428/471; 428/472; 428/472.2; 428/696; 428/697; 428/702; 250/483.1; 250/488.1
(58) Field of Search ................ 428/690, 691, 428/480, 457, 469, 471, 472, 472.2, 696, 697, 702; 250/483.1, 488.1

(56) References Cited

U.S. PATENT DOCUMENTS

| 4,327,155 A | | 4/1982 | Hanneman ................... 428/556 |
| 4,769,549 A | * | 9/1988 | Tsuchino et al. ......... 250/484.4 |
| 5,151,604 A | | 9/1992 | Kohda et al. ............. 250/484.1 |
| 5,219,606 A | | 6/1993 | Homma et al. ................ 427/65 |
| 2001/0007352 A1 | * | 7/2001 | Hell et al. ................ 250/484.4 |
| 2002/0119333 A1 | * | 8/2002 | Bretschneider et al. ..... 428/471 |

FOREIGN PATENT DOCUMENTS

EP    0 121 403    10/1984

OTHER PUBLICATIONS

European Search Report, Application No. 01 00 0696, Apr. 19, 2002.

* cited by examiner

Primary Examiner—Deborah Jones
Assistant Examiner—Wendy Boss
(74) Attorney, Agent, or Firm—Joseph T. Guy; Nexsen Pruet, LLC

(57) ABSTRACT

A binderless stimulable phosphor screen is provided, comprising a vapor deposited phosphor layer on a support, wherein between the support and the phosphor layer a ceramic layer is present, wherein said ceramic layer preferably comprises a mixture of pigments so that the optical density of the phosphor screen is higher for the stimulating wavelength than for the stimulated emission wavelength of the vapor deposited phosphor.

20 Claims, No Drawings

BINDERLESS PHOSPHOR SCREEN HAVING A PIGMENTED INTERLAYER

This application claims priority to U.S. Provisional Application No. 60/35 1,293, filed Jan. 23, 2002.

FIELD OF THE INVENTION

The present invention relates to a binderless storage phosphor screen with a vapor deposited phosphor layer.

BACKGROUND OF THE INVENTION

A well known use of storage phosphors is in the production of X-ray images. In U.S. Pat. No. 3,859,527 a method for producing X-ray images with a photostimulable phosphor, which are incorporated in a panel is disclosed. The panel is exposed to incident pattern-wise modulated X-ray beam and as a result thereof the phosphor temporarily stores energy contained in the X-ray radiation pattern. At some interval after the exposure, a beam of visible or infra-red light scans the panel in order to stimulate the release of stored energy as light that is detected and converted to sequential electrical signals which (are) be processed to produce a visible image. For this purpose, the phosphor should store as much as possible of the incident X-ray energy and emit as little as possible of the stored energy until stimulated by the scanning beam. This is called "digital radiography" or "computed radiography".

The image quality that is produced by any radiographic system using a phosphor screen, thus also by a digital radiographic system, largely depends on the construction of the phosphor screen. Generally, the thinner a phosphor screen at a given amount of absorption of X-rays, the better the image quality will be.

This means that the lower the ratio of binder to phosphor of a phosphor screen, the better the image quality, attainable with that screen, will be. Optimum sharpness can thus be obtained when screens without any binder are used. Such screens can be produced, e.g., by physical vapor deposition, which may be thermal vapor deposition, sputtering, electron beam deposition or other of phosphor material on a substrate. However, this production method can not be used to produce high quality screens with every arbitrary phosphor available. The mentioned production method leads to the best results when phosphor crystals with high crystal symmetry and simple chemical composition are used.

The use of alkali metal halide phosphors in storage screens or panels is well known in the art of storage phosphor radiology and the high crystal symmetry of these phosphors makes it possible to provide structured screens and binderless screens.

It has been disclosed that when binderless screens with an alkali halide phosphors are produced it is beneficial to have the phosphor crystal deposited as some kind of piles, needles, tiles, etc. So in U.S. Pat. No. 4,769,549 it is disclosed that the image quality of a binderless phosphor screen can be improved when the phosphor layer has a block structure, shaped in fine pillars.

In U.S. Pat. No. 5,055,681 a storage phosphor screen comprising an alkali halide phosphor in a pile-like structure is disclosed. The image quality of such screens still needs to be increased and in JP-A-06/230 198 it is disclosed that the surface of the screen with pillar like phosphors is rough and that a levelling of that surface can increase the sharpness. In U.S. Pat. No. 5,874,744 the attention is drawn to the index of refractivity of the phosphor made use from in order to produce the storage phosphor screen with a needle-like or pillar-like phosphor.

In EP-A-1 113 458 a binderless storage phosphor screen is disclosed that comprises an alkali metal storage phosphor characterized in that said screen shows an XRD-spectrum with a (100) diffraction line having an intensity $I_{100}$ and a (110) diffraction line having an intensity $I_{110}$, so that $I_{100}/I_{110} \geq 1$. Such a phosphor screen shows a better compromise between speed and sharpness.

It is known from U.S. Pat. No. 4,769,549 to use anodized aluminium as a substrate for vapor deposited phosphor layers. The use of anodized aluminium is said to have the advantage that the $Al_2O_3$ on the anodized aluminium is present as a kind of tiles. It is said that, when vapor depositing a storage phosphor layer on such a substrate, the phosphor forms in fine pillar-shaped blocks, separated from each other by voids, and that, by having such a storage phosphor layer, a very good speed/sharpness relation is realized.

The preparation of anodized aluminium however presents the drawback that a large amount of electric energy is typically required for roughening and oxidising the substrate surface. In addition, the roughening achieved by etching can generally only be carried out relatively slowly. A further disadvantage is that reprocessing of the waste products formed during anodising and during roughening of the substrate is expensive. All elements taken together make anodized aluminium a quite expensive substrate for a phosphor screen and thus the demand for a less expensive substrate that preserves the advantages of anodized aluminium is desired.

OBJECTS AND SUMMARY OF THE INVENTION

It is an object of the present invention to provide a stimulable phosphor screen useful in an X-ray recording system with a very good compromise between speed of the recording system (i.e. as low as possible patient dose) and with an image having high sharpness and low noise.

It is a further object of the invention to provide a stimulable phosphor screen useful in an X-ray recording system with a very good compromise between speed of the recording system (i.e. as low as possible patient dose) with an image with high sharpness and low noise on a quite inexpensive substrate.

The above mentioned object is realized by providing a stimulable phosphor screen having the specific features defined in claim 1. Specific features for preferred embodiments of the invention are disclosed in the dependent claims.

Further advantages and embodiments of the present invention will become apparent from the following description and drawings.

DETAILED DESCRIPTION OF THE INVENTION

By "vapor deposited phosphor" is, throughout this text, meant a phosphor that is produced by any method selected from the group consisting of thermal vapor deposition, chemical vapor deposition, electron beam deposition, radio frequency deposition and pulsed laser deposition. This vapor deposition is preferably carried out under conditions as described in EP-A-1 113 458.

It has been shown now that it is possible to produce binderless phosphor screens on a substrate covered with a ceramic layer. Such a ceramic layer contains at least one inorganic pigment selected from the group consisting of $Al_2O_3$, $TiO_2$, $SiO_2$ and ZnO. Preferably a ceramic layer for use in a storage phosphor screen of this invention comprises $Al_2O_3$, optionally mixed with other inorganic pigments.

The preparation of a substrate for a binderless storage phosphor screen by applying a ceramic layer on it has, apart from the advantages mentioned earlier, also the advantage that the size of the "tiles" whereupon the vapor deposited phosphor grows, can easily be controlled by controlling the size of the pigment particles forming the ceramic layer. Furthermore the ceramic layer can comprises, besides $Al_2O_3$, other pigment particles. This provides opportunities in order to get a support that can be coloured and the spectral reflectance and absorbance of which can be tuned in order to have a support that absorbs the stimulating light and reflects the stimulated light, thus enhancing the sharpness of the storage phosphor screen. Contrary to anodized aluminium that is basically white and thus reflects both stimulating light and stimulated light, absorption of the stimulating light and reflection of the stimulated light is now provided as desired. When it is desired to have a coloured ceramic layer on the substrate for a storage phosphor screen of this invention, the ceramic layer is produced in order to comprise $Al_2O_3$ and, optionally, $TiO_2$, together with a blue inorganic pigment.

Commercially available very useful blue and blue green inorganic pigments are ceramic pigments as e.g. blue or blue-green pigments chosen from the series of SICOCER A, SICOCER B, SICOCER E, SICOCER F, SICOCER G, SICOCER I, SICOCER P, SICOCER R, SICOCER S, SICOCER U, all sold by BASF, Ludwigshafen, Germany.

There are several methods known to deposit a ceramic layer on a substrate. One of the methods comprises the steps of selecting a particulate coating material and depositing this coating material on the substrate by a thermal spraying technique. Such a method has been disclosed e.g. in U.S. Pat. No. 5,881,645. This however is not a preferred embodiment for producing a substrate for a storage phosphor screen of the present invention as energy consumption of thermal spraying techniques is quite high.

Another technique for providing a ceramic layer comprises the steps of applying a slurry of at least one monobasic phosphate and non-metallic inorganic particles to the surface of the substrate and forming a ceramic coating by firing the slurry at a temperature of at least 230° C. Such a technique has been disclosed in PCT/Application WO-A-83 00844. Due to the processing temperature of at least 230° C., this method is suitable for applying a ceramic layer on a metal substrate, e.g., aluminium, steel, brass and copper, but the method is less suitable to be applied in order to get a ceramic layer on a polymeric film substrate.

Another method for applying a ceramic layer on a substrate, comprises the steps of providing an aqueous dispersion comprising a silicate compound and at least one inorganic pigment, thereby applying this dispersion to a substrate by any coating technique known in the art and drying at a temperature between 130 to 220° C. Such a method has been disclosed in U.S. Pat. No. 6,240,846 and in the corresponding EP-A-0 992 342, wherein one of the objects of that invention was to provide a process for producing a material which, without consuming a large amount of energy, would lead to very good and durable adhesion of a ceramic layer to a substrate. According to that invention a material was provided comprising a substrate and a ceramic layer applied to a surface of that substrate, wherein the ceramic layer was composed of at least one silicate compound and aluminum oxide with an aluminum purity of at least 99.6% by weight, and wherein the ceramic layer adhered to the substrate with the silicate compound functioning as a binder. This method is, in the context of the present invention, very suitable for producing a substrate for use in a storage phosphor screen, since the fairly low drying temperature in the process makes the method well suited both for applying a ceramic layer to a metallic substrate and to a polymeric film substrate. When a polymeric substrate is used, it is preferred to use a polyester substrate, e.g., polyethylene terephthalate, polyethylenenaphthalate or a polycarbonate substrate.

Silicate compounds which are suitable compounds for use in the manufacturing of the screen or panel according to the present invention include sodium silicate in form of sodium water glass as a binder, where the solid content of an aqueous solution of the sodium water glass is advantageously 30% by weight, and wherein advantageously from 2 to 4 moles of $SiO_2$ are present per 1 mole of sodium oxide ($Na_2O$). Another suitable silicate compound is potassium silicate, which is less sensitive to air-carbon dioxide than sodium silicate.

By adjusting the average grain size of the mixed inorganic pigments dispersed in the aqueous dispersion versus the thickness of the coated ceramic layer, the texture of the ceramic layer can be designed so in order to have a substrate whereupon the vapor deposited phosphor grows in needle-shaped crystals with a given width. The pigments mixed in the dispersion preferably have an average grain size (numeric) of between 0.5 and 100 μm, more preferably between 3 and 60 μm, and still more preferably between 4 and 40 μm. The thickness of the dried ceramic layer is preferably between 0.5 and 20 μm and the average grain size of the pigment particles is adjusted in order to protrude to an average extent of from 0.5 and 80 μm from the ceramic layer. The aqueous dispersion containing the inorganic pigments is coated on the substrate in order to have an average amount of particles per $m^2$ from $10^6$ to $10^{11}$. More preferably the dispersion is coated in order to have an average amount of particles per $m^2$ from $10^7$ to $10^9$. The number of particles depends on the average grain size of the particles, the diameter of the phosphor needles and the dimensions of the voids (gaps) between the needles as desired.

A storage phosphor screen according to the present invention can be prepared by vacuum deposition of the phosphor crystals on the substrate as well as by combining (mixing) the ingredients for the phosphor (phosphor precursors) and then evaporating this mixture in order to have the phosphor formed in situ during evaporation.

The phosphor in a binderless phosphor screen according to the present invention can be any stimulable metal phosphor known in the art. Preferably the storage phosphor used in a binderless phosphor screen of the present invention is an alkali metal phosphor. Very suitable phosphors are, e.g., phosphors according to formula I:

$$M^{1+}X.aM^{2+}X'_2bM^{3+}X''_3:cZ \qquad (I)$$

wherein:

$M^{1+}$ is at least one member selected from the group consisting of Li, Na, K, Cs and Rb, $M^{2+}$ is at least one member selected from the group consisting of Be, Mg, Ca, Sr, Ba, Zn, Cd, Cu, Pb and Ni, $M^{3+}$ is at least one member selected from the group consisting of Sc, Y, La, Ce, Pr, Nd, Pm, Sm, Eu, Gd, Tb, Dy, Ho, Er, Tm, Yb, Lu, Al, Bi, In and Ga, Z is at least one member selected from the group consisting of $Ga^{1+}$, $Ge^{2+}$, $Sn^{2+}$, $Sb^{3+}$ and $As^{3+}$, X, X' and X" can be the same or different, each of them representing a halogen atom selected from the group consisting of F, Br, Cl, I and $0 \leq a \leq 1$, $0 \leq b \leq 1$ and $0 < c \leq 0.2$. Such phosphors have been disclosed in, e.g., U.S. Pat. No. 5,736,069.

Highly preferred phosphors for use in a binderless phosphor screen of the present invention are CsX:Eu stimulable phosphors, wherein X represents a halide selected from the group consisting of Br and Cl prepared by a method comprising the steps of:

mixing said CsX with an amount between $10^{-3}$ and 5 mole % of a Europium compound selected from the group consisting of $EuX'_2$, $EuX'_3$ and $EuOX'$, X' being a member selected from the group consisting of F, Cl, Br and I;

firing said mixture at a temperature above 450° C.;

cooling said mixture and recovering the CsX:Eu phosphor.

Most preferably a CsBr:Eu stimulable phosphor, is used prepared by a method comprising the steps of:

mixing said CsX with an amount between $10^{-3}$ and 5 mole % of a Europium compound selected from the group consisting of $EuX'_2$, $EuX'_3$ and $EuOX'$, X' being a member selected from the group consisting of F, Cl, Br and I;

firing said mixture at a temperature above 450° C.;

cooling said mixture and recovering the CsX:Eu phosphor.

The binderless screen can be prepared by bringing the finished phosphor on the support by any method selected from the group consisting of thermal vapor deposition, chemical vapor deposition, electron beam deposition, radio frequency deposition and pulsed laser deposition. In the alternative it is possible to bring the alkali metal halide and the dopant together, thereby depositing them both on the support in such a way that the alkali metal phosphor is doped during the manufacturing of the screen. Thus the present invention encompasses a method for manufacturing a phosphor screen containing a CsX:Eu stimulable phosphor, wherein X represents a halide selected from the group consisting of Br and Cl comprising the steps of:

bringing in condition for vapor deposition multiple containers of said CsX and a Europium compound selected from the group consisting of $EuX'_2$, $EuX'_3$ and $EuOX'$, X' being a halide selected from the group consisting of F, Cl, Br and I; and depositing both said CsX and said Europium compound on a substrate in such a ratio amount that on said substrate a CsX phosphor, doped with between $10^{-3}$ and 5 mole % of Europium, is formed, by a method selected from the group consisting of thermal vapor deposition, chemical vapor deposition, electron beam deposition, radio frequency deposition and pulsed laser deposition.

The deposition can proceed from a single container, containing a mixture of the starting compounds in the desired proportions. Thus the method applied in the present invention further encompasses a method for manufacturing a phosphor screen containing a CsX:Eu stimulable phosphor, wherein X represents a halide selected from the group consisting of Br and Cl comprising the steps of:

mixing said CsX with between $10^{-3}$ and 5 mole % of a Europium compound selected from the group consisting of $EuX'_2$, $EuX'_3$ and $EuOX'$, X' being a halide selected from the group consisting of F, Cl, Br and I;

bringing said mixture in condition for vapor deposition and depositing said mixture on a substrate by a method selected from the group consisting of physical vapor deposition, thermal vapor deposition, chemical vapor deposition, electron beam deposition, radio frequency deposition and pulsed laser deposition.

What is claimed is:

1. A binderless phosphor screen comprising a vapor deposited phosphor layer on a substrate characterized in that a ceramic layer containing at least one inorganic pigment is present between said substrate and said phosphor layer wherein said substrate is a metal or an alloy selected from the group of aluminium, steel, brass and copper.

2. A binderless phosphor screen according to claim 1 wherein said at least one inorganic pigment is a white pigment selected from the group consisting of $Al_2O_3$, $TiO_2$, $SiO_2$ and ZnO.

3. A binderless phosphor screen according to claim 2 wherein said ceramic layer further comprises at least one inorganic pigment absorbing stimulating light.

4. A binderless phosphor screen according to claim 1 wherein said ceramic layer is applied to said substrate by a thermal spraying technique.

5. A binderless phosphor screen according to claim 1 wherein said ceramic layer is applied to said substrate by coating an aqueous dispersion comprising a silicate and said at least one inorganic pigment.

6. A binderless stimulable phosphor screen according to claim 1, wherein said phosphor is an alkali metal phosphor.

7. A binderless phosphor screen comprising a vapor deposited phosphor layer on a substrate characterized in that a ceramic layer containing at least one inorganic pigment is present between said substrate and said phosphor layer wherein said substrate is a polymeric film.

8. A binderless phosphor screen according to claim 7, wherein said polymeric film is a polyester film.

9. A binderless stimulable phosphor screen according to claim 7, wherein said phosphor is an alkali metal phosphor.

10. A binderless stimulable phosphor screen according to claim 8, wherein said phosphor is an alkali metal phosphor.

11. A binderless stimulable phosphor screen comprising a vapor deposited phosphor layer on a substrate characterized in that a ceramic layer containing at least one inorganic pigment is present between said substrate and said phosphor layer wherein said phosphor is an alkali metal phosphor.

12. A binderless stimulable phosphor screen according to claim 11, wherein said alkali metal phosphor is a CsX:Eu stimulable phosphor, wherein X represents a halide selected from the group consisting of Br and Cl, said phosphor being prepared by a method comprising the steps of:

mixing said CsX with an amount between $10^{-3}$ and 5 mole % of a Europium compound selected from the group consisting of $EuX'_2$, $EuX'_3$ and $EuOX'$, X' being a member selected from the group consisting of F, Cl, Br and I, firing said mixture at a temperature above 450° C.

cooling said mixture and recovering the CsX:Eu phosphor.

13. A binderless phosphor screen comprising a vapor deposited phosphor layer on a substrate characterized in that a ceramic layer containing at least one inorganic pigment is present between said substrate and said phosphor layer wherein said at least one inorganic pigment is a white pigment selected from the group consisting of $Al_2O_3$, $TiO_2$, $SiO_2$ and ZnO wherein said substrate is a polymeric film.

14. A binderless phosphor screen according to claim 13 wherein said ceramic layer further comprises at least one inorganic pigment absorbing stimulating light.

15. A binderless phosphor screen comprising a vapor deposited phosphor layer on a substrate characterized in that a ceramic layer containing at least one inorganic pigment is present between said substrate and said phosphor layer wherein said ceramic layer is applied to said substrate by a thermal spraying technique wherein said substrate is a polymeric film.

16. A binderless phosphor screen comprising a vapor deposited phosphor layer on a substrate characterized in that a ceramic layer containing at least one inorganic pigment is present between said substrate and said phosphor layer wherein said ceramic layer is applied to said substrate by coating an aqueous dispersion comprising a silicate and said at least one inorganic pigment wherein said substrate is a polymeric film.

17. A binderless stimulable phosphor screen comprising a vapor deposited phosphor layer on a substrate characterized in that a ceramic layer containing at least one inorganic pigment is present between said substrate and said phosphor layer wherein said at least one inorganic pigment is a white pigment selected from the group consisting of $Al_2O_3$, $TiO_2$, $SiO_2$ and ZnO wherein said phosphor is an alkali metal phosphor.

18. A binderless stimulable phosphor screen according to claim 17 wherein said ceramic layer further comprises at least one inorganic pigment absorbing stimulating light.

19. A binderless stimulable phosphor screen comprising a vapor deposited phosphor layer on a substrate characterized in that a ceramic layer containing at least one inorganic pigment is present between said substrate and said phosphor layer wherein said ceramic layer is applied to said substrate by a thermal spraying technique wherein said phosphor is an alkali metal phosphor.

20. A binderless stimulable phosphor screen comprising a vapor deposited phosphor layer on a substrate characterized in that a ceramic layer containing at least one inorganic pigment is present between said substrate and said phosphor layer wherein said ceramic layer is applied to said substrate by coating an aqueous dispersion comprising a silicate and said at least one inorganic pigment wherein said phosphor is an alkali metal phosphor.

* * * * *